United States Patent
Tandon (10) Patent No.: US 10,149,000 B2
(45) Date of Patent: Dec. 4, 2018

(54) METHOD AND SYSTEM FOR REMOTE ALTERING STATIC VIDEO CONTENT IN REAL TIME

(71) Applicant: Excalibur IP, LLC, New York, NY (US)

(72) Inventor: Ankit Tandon, Bangalore (IN)

(73) Assignee: EXCALIBUR IP, LLC, New York, NY (US)

(*) Notice: Subject to any disclaimer, the term of this patent is extended or adjusted under 35 U.S.C. 154(b) by 49 days.

(21) Appl. No.: 15/151,882

(22) Filed: May 11, 2016

(65) Prior Publication Data

US 2016/0255395 A1 Sep. 1, 2016

Related U.S. Application Data

(63) Continuation of application No. 13/669,444, filed on Nov. 6, 2012, now Pat. No. 9,369,766.

(51) Int. Cl.
| | |
|---|---|
| *H04N 21/43* | (2011.01) |
| *H04N 21/45* | (2011.01) |
| *H04N 21/462* | (2011.01) |
| *H04N 21/81* | (2011.01) |
| *H04N 21/242* | (2011.01) |
| *H04N 21/44* | (2011.01) |

(52) U.S. Cl.
CPC ....... *H04N 21/4307* (2013.01); *H04N 21/242* (2013.01); *H04N 21/44016* (2013.01); *H04N 21/4524* (2013.01); *H04N 21/4622* (2013.01); *H04N 21/812* (2013.01)

(58) Field of Classification Search
CPC ......... H04N 21/4394; H04N 21/44008; H04N 21/812; H04N 21/23418; H04N 21/4325; H04N 21/23424; H04N 21/44016; H04N 19/172; H04N 21/23611; H04N 21/8126; G06F 3/14; H04L 65/104; H04L 65/608
See application file for complete search history.

(56) References Cited

U.S. PATENT DOCUMENTS

| 8,218,654 B2 | 7/2012 | Cheng et al. |
| 2007/0005651 A1* | 1/2007 | Levien .................... G06F 21/10 |
| 2007/0276926 A1* | 11/2007 | Lajoie .................... G06F 21/10 |
| | | 709/219 |

(Continued)

*Primary Examiner* — Sm A Rahman
*Assistant Examiner* — Ranjan Pant
(74) *Attorney, Agent, or Firm* — Brinks Gilson & Lione (57) ABSTRACT

Methods and devices for remote altering of static video content in real time are provided. A method for encoding video includes removing an attribute from a video including the attribute and static content. The attribute and static content may be configured to be played by a first device. The method also includes replacing the removed attribute with content to be played by the first device in place of the removed attribute. The method further includes embedding a synchronization marker in the video. The embedded synchronization marker may be configured to synchronize streaming of content from a second device to the first device with playing of the static content by the first device. A system for encoding video includes a processor and a memory storing instructions configured to, when executed by the processor, cause the processor to perform steps of a method. A memory may be a non-transitory computer-readable medium.

18 Claims, 5 Drawing Sheets

(56) References Cited

U.S. PATENT DOCUMENTS

| | | | |
|---|---|---|---|
| 2007/0277197 A1* | 11/2007 | Dawson | G06Q 20/085 725/37 |
| 2008/0163283 A1* | 7/2008 | Tan | H04N 7/163 725/20 |
| 2008/0249834 A1 | 10/2008 | Zigmond et al. | |
| 2009/0003432 A1* | 1/2009 | Liu | H04N 21/23406 375/240.01 |
| 2009/0235364 A1 | 9/2009 | Cohen et al. | |
| 2009/0300699 A1* | 12/2009 | Casagrande | H04N 5/76 725/116 |
| 2010/0042496 A1 | 2/2010 | Wang et al. | |
| 2010/0106556 A1 | 4/2010 | Vee et al. | |
| 2010/0185485 A1 | 7/2010 | Vee et al. | |
| 2010/0325657 A1* | 12/2010 | Sellers | H04N 21/23424 725/32 |
| 2011/0103770 A1* | 5/2011 | Goodman | H04N 7/141 386/255 |
| 2012/0030182 A1* | 2/2012 | Claman | G11B 27/034 707/690 |
| 2012/0203799 A1 | 8/2012 | Blanchflower et al. | |

* cited by examiner

METHOD AND SYSTEM FOR REMOTE ALTERING STATIC VIDEO CONTENT IN REAL TIME

RELATED APPLICATIONS

The present application is a continuation of U.S. patent application Ser. No. 13/669,444 (still pending), filed on Nov. 6, 2012, the entire disclosure of which is hereby incorporated by reference.

TECHNICAL FIELD

Embodiments of the disclosure relate to the field of remote altering static video content in real time.

BACKGROUND

Currently, users are able to view videos either online, for example on a website, or offline, for example on an optical disk. However, such videos are usually not original videos and have blackened portions in place of controversial content. The controversial content is also generalized for the users. The users are hence not interested in watching such videos as visual experience is decreased. Further, in few of the videos, advertisements are also outdated.

In light of the foregoing discussion, there is a need for a method and system for an efficient technique to remotely alter static video content in real time.

SUMMARY

The above-mentioned needs are met by a method, a computer program product and a system for remote altering static video content in real time.

An example of a method of remote altering static video content in real time includes encountering one or more synchronization markers embedded in a video. The video includes the static video content that plays on an electronic device. The method also includes contacting a content server along with a plurality of user parameters. The method further includes receiving streamed content for the video from the content server. The streamed content is determined based on the plurality of user parameters and a set of rules. Further, the method includes adding the streamed content to the static video content at the one or more synchronization markers. Moreover, the method includes rendering a hybrid video to a user. The hybrid video includes the streamed content and the static video content.

An example of a computer program product stored on a non-transitory computer-readable medium that when executed by a processor, performs a method of remote altering static video content in real time includes encountering one or more synchronization markers embedded in a video. The video includes the static video content that plays on an electronic device. The computer program product also includes contacting a content server along with a plurality of user parameters. The computer program product further includes receiving streamed content for the video from the content server. The streamed content is determined based on the plurality of user parameters and a set of rules. Further, the computer program product includes adding the streamed content to the static video content at the one or more synchronization markers. Moreover, the computer program product includes rendering a hybrid video to a user. The hybrid video includes the streamed content and the static video content.

An example of a system for remote altering static video content in real time includes an electronic device. The system also includes a communication interface in electronic communication with the electronic device. The system further includes a memory that stores instructions, and a processor. The processor is responsive to the instructions to encounter one or more synchronization markers embedded in a video. The video includes the static video content that plays on an electronic device. The processor is also responsive to the instructions to contact a content server along with a plurality of user parameters and receive streamed content for the video from the content server. The streamed content is determined based on the plurality of user parameters and a set of rules. The processor is further responsive to the instructions to add the streamed content to the static video content at the one or more synchronization markers and to render a hybrid video to a user. The hybrid video includes the streamed content and the static video content.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a method, computer program product and system for remote altering static video content in real time. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
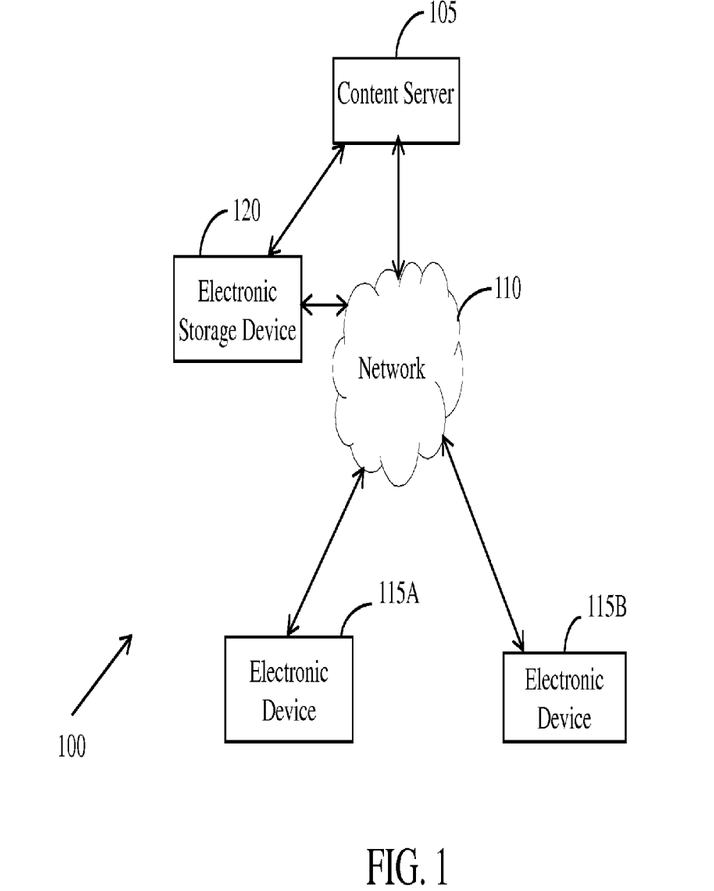
FIG. 1 is a block diagram of an environment, in accordance with which various embodiments can be implemented.

FIG. 1 is a block diagram of an environment 100, in accordance with which various embodiments can be implemented.

The environment 100 includes a content server 105 connected to a network 110. The environment 100 further includes one or more electronic devices, for example an electronic device 115A and an electronic device 115B, which can communicate with each other through the network 110. Examples of the electronic devices include, but are not limited to, computers, mobile devices, tablets, laptops, palmtops, hand held devices, telecommunication devices, and personal digital assistants (PDAs).

The electronic devices can communicate with the content server 105 through the network 110. Examples of the network 110 include, but are not limited to, a Local Area Network (LAN), a Wireless Local Area Network (WLAN), a Wide Area Network (WAN), internet, and a Small Area Network (SAN). The electronic device 115A associated with a content producer and the electronic device 115B associated with different users can be remotely located with respect to the content server 105.

The content server 105 is also connected to an electronic storage device 120 directly or via the network 110 to store information, for example streamed content, a plurality of user parameters, and one or more attributes of the video.

In some embodiments, different electronic storage devices are used for storing the information.

One or more synchronization markers are encountered embedded in a video including static video content that plays on the electronic device 115B. The video is a basic video removed of one or more attributes by the content producer of the electronic device 115A. The content server 105, for example a Yahoo!® content server, is contacted along with a plurality of user parameters. The electronic device 115B then receives streamed content for the video from the content server 105. The streamed content is determined based on the user parameters and a set of rules. The streamed content is then added to the static video content at the synchronization markers. A hybrid video is subsequently rendered to a user of the electronic device 115B. The hybrid video includes both the streamed content and the static video content.

Figure 2:
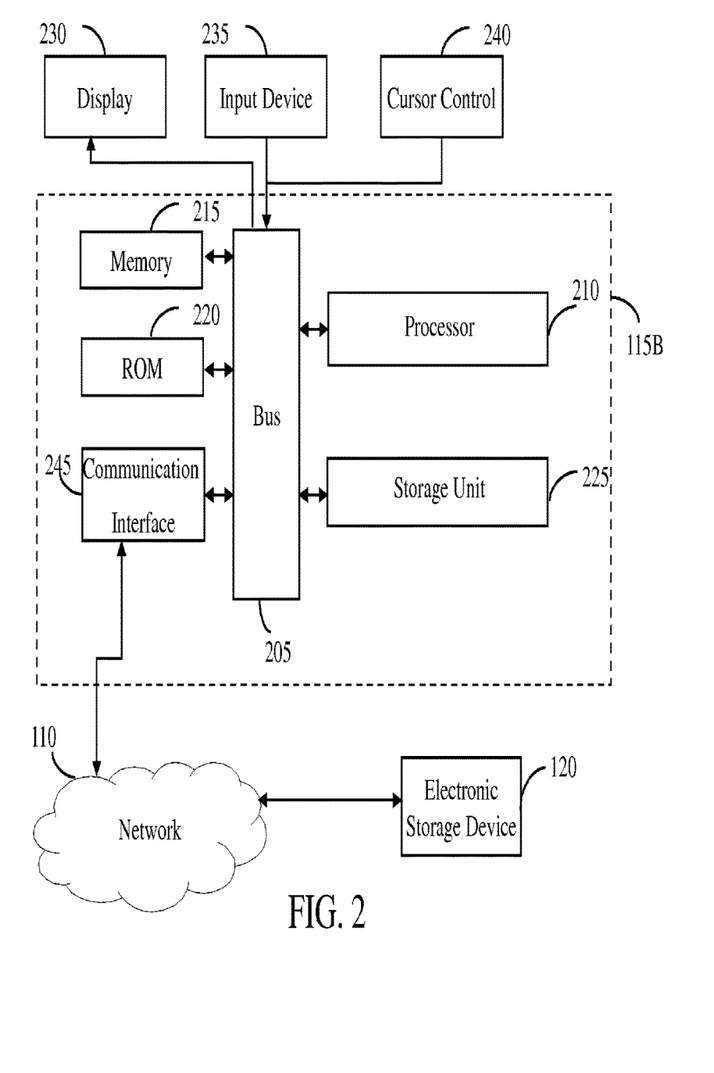
FIG. 2 is a block diagram of an electronic device, in accordance with one embodiment.

The electronic device 115B including a plurality of elements is explained in detail in conjunction with FIG. 2.

FIG. 2 is a block diagram of the electronic device 115B, in accordance with one embodiment.

The electronic device 115B includes a bus 205 or other communication mechanism for communicating information, and a processor 210 coupled with the bus 205 for processing information. The electronic device 115B also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The electronic device 115B further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example streamed content, a plurality of user parameters, and one or more attributes of the video.

The electronic device 115B can be coupled via the bus 205 to a display 230, for example a cathode ray tube (CRT), and liquid crystal display (LCD) for displaying the video. An input device 235, including alphanumeric and other keys, is coupled to the bus 205 for communicating information and command selections to the processor 210. Another type of user input device is a cursor control 240, for example a mouse, a trackball, or cursor direction keys for communicating direction information and command selections to the processor 210 and for controlling cursor movement on the display 230. The input device 235 can also be included in the display 230, for example a touch screen.

Various embodiments are related to the use of the electronic device 115B for implementing the techniques described herein. In some embodiments, the techniques are performed by the electronic device 115B in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the electronic device 115B, various machine-readable media are involved, for example, in providing instructions to the processor 210 for execution. The machine-readable medium can be a storage medium, either volatile or non-volatile. A volatile medium includes, for example, dynamic memory, for example the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the electronic device 115B can read, for example online software, download links, installation links, and online links. For example, the instructions can initially be carried on a magnetic disk of a remote computer. The remote computer can load the instructions into its dynamic memory and send the instructions over a telephone line using a modem. A modem local to the electronic device 115B can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The electronic device 115B also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. Wireless links can also be implemented. In any such implementation, the communication interface 245 sends and receives electrical, electromagnetic or optical signals that carry digital data streams representing various types of information.

The electronic device 115B is also connected to the electronic storage device 120 to store the streamed content, the user parameters, and the attributes of the video.

The processor 210 in the electronic device 115B encounters one or more synchronization markers embedded in a video. The video includes the static video content that plays on the electronic device 115B. The processor 210 contacts a content server 105 along with a plurality of user parameters. The processor 210 then receives streamed content for the video from the content server 105. The streamed content is determined based on the user parameters and a set of rules. The processor 210 further adds the streamed content to the static video content at the synchronization markers and renders a hybrid video to a user. The hybrid video includes the streamed content and the static video content.

Figure 3:
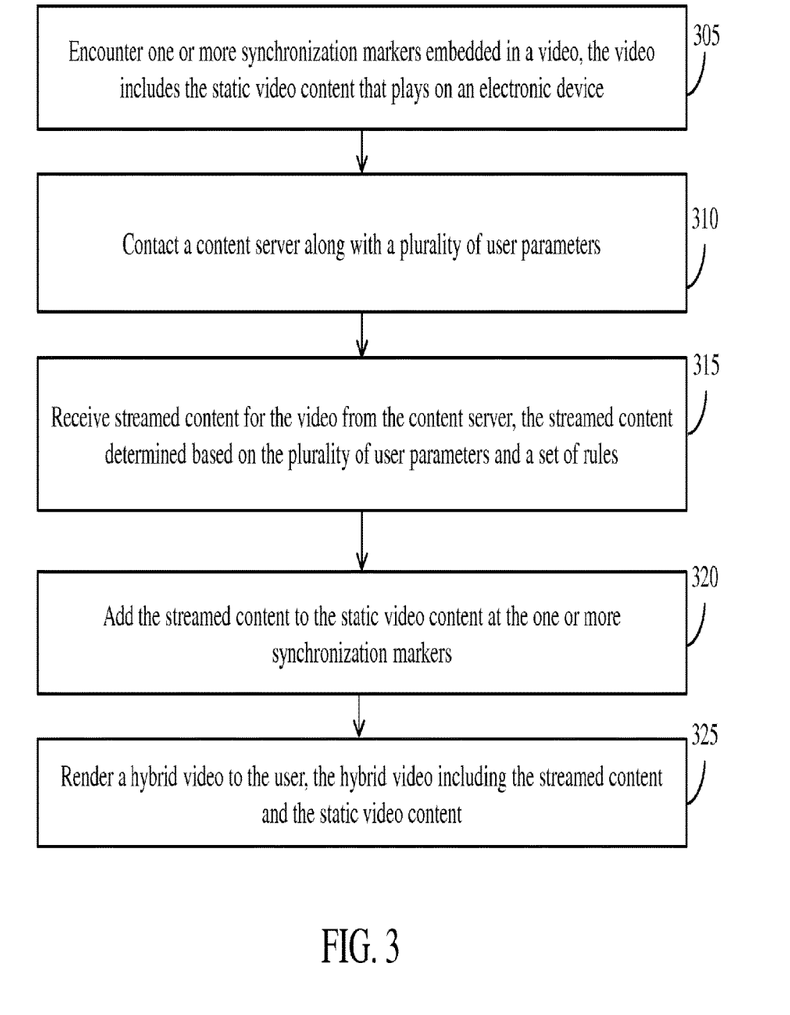
FIG. 3 is a flowchart illustrating a method of remote altering static video content in real time, in accordance with one embodiment.

FIG. 3 is a flowchart illustrating a method of remote altering static video content in real time, in accordance with one embodiment.

An encoding process is first implemented on a video. The encoding process includes a content producer using an electronic device, for example the electronic device 115A. The content producer removes one or more attributes of the video and renders a basic video. Examples of the attributes include, but are not limited to, subtitles, credits, an audio portion, a picture frame, and a portion of a picture frame. The basic video can be tagged with a global identification and meta information associated with a content server. The basic video is further distributed through different mediums, for example optical disks, web streaming, and file sharing. When the basic video is played in isolation, blackened portions are played in place of the attributes. The encoding process is described in detail in conjunction with FIG. 4.

Typically, the encoding process for the video uses a Moving Picture Experts Group (MPEG) compression algorithm. The MPEG compression algorithm uses a combination of three types of picture frames—an I frame, a P frame, and a B frame. The I frame is defined as an intra coded frame or a key frame that is a fully specified picture, for example a conventional static image file. The P frame is defined as a predicted frame that holds changes in an image from a preceding frame. The B frame is defined as a bi-predictive frame that saves space by using differences between a current frame and both the preceding frame and a following frame to specify its content.

At step 305, one or more synchronization markers are encountered embedded in the video. The content producer embeds the synchronization markers during the encoding process. The video includes the static video content that plays on an electronic device, for example the electronic device 115B, of a user. In one example, the video can be included on an optical disk or in memory of the electronic device. A decoding process is initiated by the electronic device on encountering the synchronization markers. The decoding process is described in detail in conjunction with FIG. 5.

In some embodiments, the synchronization markers are embedded 60 seconds apart.

At step 310, the content server, for example the content server 105, is contacted along with a plurality of user parameters. Examples of the user parameters include, but are not limited to, Internet Protocol (IP) address, user identification (ID), and user preferences. The electronic device contacts the content server along with the user parameters. In one example, the IP address can determine location of the user which can be used in combination with local government regulations to censor political or hate speech, ideologies and content deemed appropriate. The location of user can also help alter disclaimers and warnings shown at the start of the video. In one example, the user ID can include settings for parental control where profanity, for example language, nudity, and violence, can be blacked out or silenced for children or adults. In one example, the user preferences can include language preferences that determine text language or audio language to be used for credits, subtitles, and audio in real time.

At step 315, streamed content is received for the video from the content server. The streamed content is determined based on the user parameters and a set of rules. The streamed content from the content server includes the attributes that were initially removed from the video. Hence, based on the user parameters, the content server first decides the set of rules. Examples of the set of rules include, but are not limited to, rules concerning location, age, and preferences on profanity, audio and text language. The streamed content is then sent from the content server to the electronic device of the user.

In some embodiments, the streamed content includes latest advertisements, for example video banner advertisements, that can be embedded at bottom of a screen during playing of the video. Ad impressions can be determined and both the video and the advertisements can be monetized.

At step 320, the streamed content is added to the static video content at the synchronization markers. The synchronization markers are used to synchronize the static video content with the streamed content obtained from the content server.

In some embodiments, the attributes are annotated with a playback timer in accordance with the synchronization markers.

In some embodiments, the streamed content from the content server is buffered until each of the synchronization markers are encountered in the video.

At step 325, a hybrid video is rendered to the user. The hybrid video includes the streamed content and the static video content superimposed with each other. The hybrid video is the video that is in accordance with the user parameters and the set of rules concerning the user.

In some embodiments, the streamed content, the user parameters, and the attributes of the video can be stored in an electronic storage device, for example the electronic storage device 120.

In other embodiments, the streamed content, the user parameters, and the attributes of the video can be stored in a storage unit, for example the storage unit 225, in the content server. In one example, the content server can be a centralized server or a distributed server of Yahoo!®.

Figure 4:
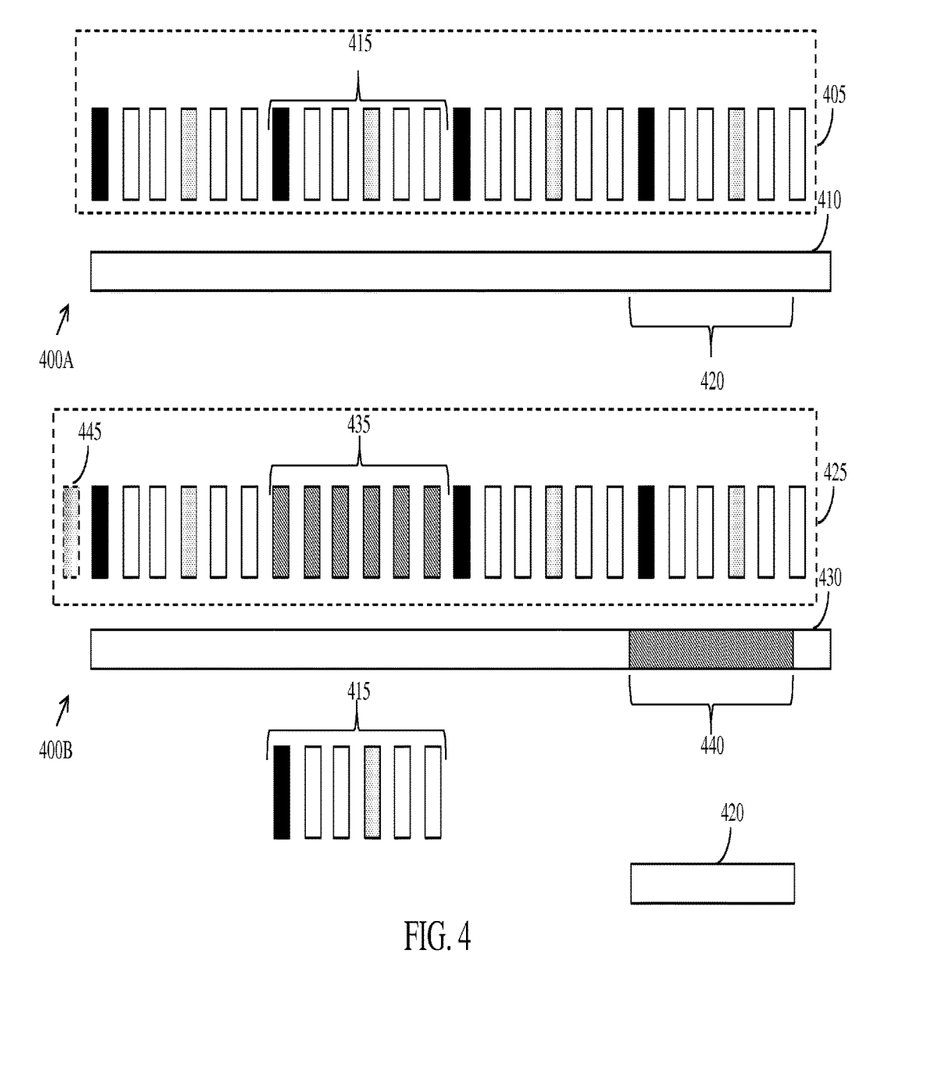
FIG. 4 is an exemplary illustration of an encoding process, in accordance with one embodiment.

FIG. 4 is an exemplary illustration of an encoding process, in accordance with one embodiment. A video 400A includes video frames 405 and an audio track 410. The video frames further include the different types of frames—I frame, P frame, and B frame. During the encoding process, it is determined that certain attributes, for example a dynamic video content 415 and a dynamic audio content 420, that are controversial need to be removed from the video 400A. The dynamic video content 415 and the dynamic audio content 420 is then split from static video content and static audio content respectively to provide a video 400B that is a basic video.

The video 400B includes video frames 425 and an audio track 430 that represent the static video content. The video frames 425 include a blackened portion 435 in place of the dynamic video content 415 and the audio track 430 includes a blackened portion 440 in place of the dynamic audio content 420. Synchronization markers, for example a synchronization marker 445, are embedded in the video 400B to enable synchronization between the static video content and streamed content from a content server during a decoding process. The dynamic video content 415 and the dynamic audio content 420 that are removed are further annotated with a playback timer in accordance with the synchronization markers and stored in the content server. The video 400B is further tagged with a global identification and meta information associated with the content server. The video 400B is further distributed through different mediums, for example optical disks, web streaming, and file sharing. When the video 400B is played in isolation, the blackened portion 435 and the blackened portion 440 are played in place of the dynamic video content 415 and the dynamic audio content 420 respectively.

Figure 5:
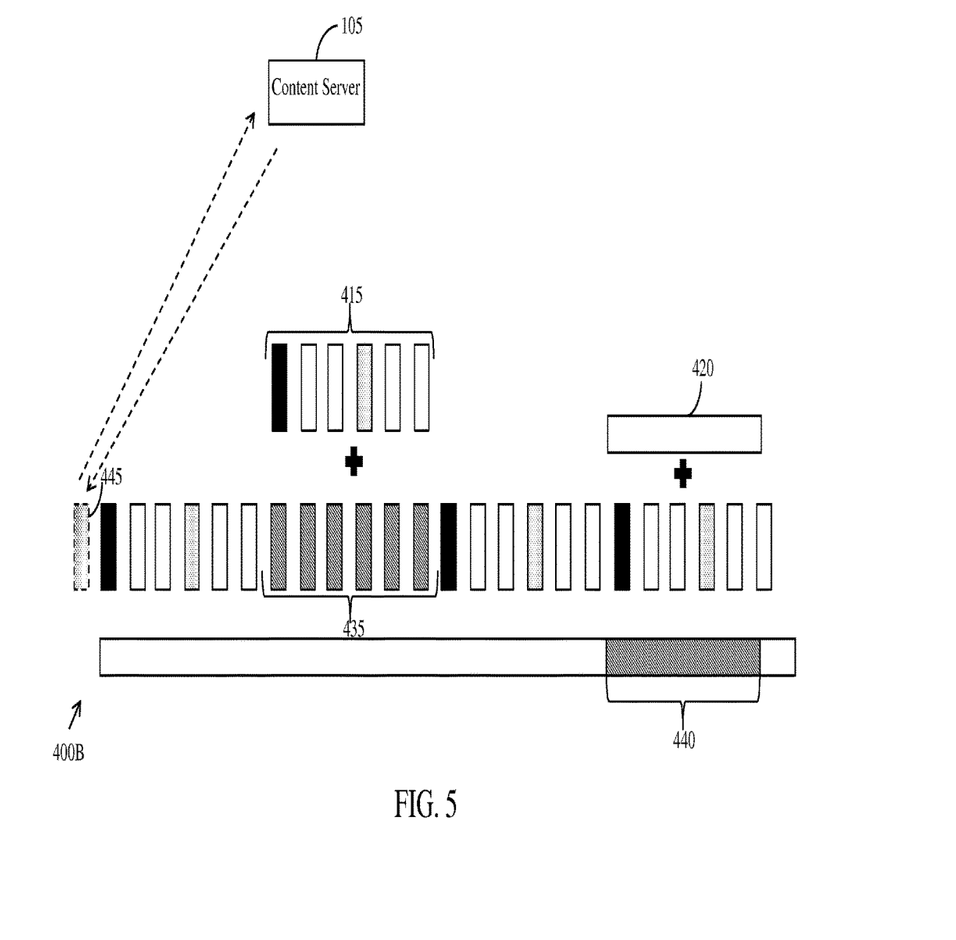
FIG. 5 is an exemplary illustration of a decoding process, in accordance with one embodiment.

FIG. 5 is an exemplary illustration of the decoding process, in accordance with one embodiment. A user plays the video 400B on an electronic device. The video includes only the static video content. The synchronization markers, for example a synchronization marker 445, which are embedded in the video are then encountered. The content server, for example the content server 105, is contacted by sending a request along with user parameters. The content server determines and streams the streamed content for the video 400B from the content server based on the user parameters and a set of rules. The streamed content includes one or more of the attributes, for example the dynamic video content 415 and the dynamic audio content 420, which were initially removed from the video 400A during the encoding process. The streamed content is then added to the static video content at the relevant synchronization markers. The user can then view a hybrid video that includes both the streamed content, for example the dynamic video content 415 and the dynamic audio content 420, and the static video content. In FIG. 5, the hybrid video is similar to the video 400A of FIG. 4.

The present disclosure enables remote altering static video content in real time based on user parameters and a set of rules. A video can hence be customized according to each user. The user parameters further enable a content server to deliver latest advertisements, for example video banner advertisements, embedded at bottom of a screen during playback of the video. Hence, the method and system in the present disclosure enables Yahoo! to provide an enhanced visual experience for users.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method for encoding video, comprising:
   removing, with a processor, an attribute from a video comprising the attribute and static content, the attribute and the static content each configured to be played by a first device;
   replacing, with a processor, the removed attribute with content to be played by the first device in place of the removed attribute; and
   embedding, with a processor, a synchronization marker in the video,
      wherein the embedded synchronization marker is configured such that when the first device encounters the embedded synchronization marker, the first device sends to a second device a request for the removed attribute,
      wherein the embedded synchronization marker is further configured to synchronize streaming of the removed attribute from the second device to the first device with playing of the static content by the first device, such that a hybrid video that includes both the removed attribute and the static content is formed, and
      wherein the embedded synchronization marker is further configured such that when the first device encounters the embedded synchronization marker, the first device sends to the second device user information configured to indicate to the second device whether a user of the first device is qualified to receive the removed attribute from the second device.

2. The method of claim 1, further comprising annotating, with a processor, the removed attribute in accordance with the embedded synchronization marker.

3. The method of claim 2, wherein annotating the removed attribute comprises annotating the removed attribute with a playback timer in accordance with the synchronization marker.

4. The method of claim 2, further comprising storing, with a processor, the annotated removed attribute in the second device.

5. The method of claim 1, wherein the attribute comprises at least one of subtitles, credits, audio content, video content, a picture frame, or a portion of a picture frame.

6. The method of claim 1, wherein the embedded synchronization marker is further configured to indicate to the first device where to add the removed attribute to the static content in order to form the hybrid video.

7. A device for encoding video, comprising:
a processor; and
a memory storing instructions configured to, when executed by the processor, cause the processor to:
remove an attribute from a video comprising the attribute and static content, the attribute and the static content each configured to be played by a first device;
replace the removed attribute with content to be played by the first device in place of the removed attribute; and
embed a synchronization marker in the video,
wherein the embedded synchronization marker is configured such that when the first device encounters the embedded synchronization marker, the first device sends to a second device a request for the removed attribute,
wherein the embedded synchronization marker is further configured to synchronize streaming of the removed attribute from the second device to the first device with playing of the static content by the first device, such that a hybrid video that includes both the removed attribute and the static content is formed, and
wherein the embedded synchronization marker is further configured such that when the first device encounters the embedded synchronization marker, the first device sends to the second device user information configured to indicate to the second device whether a user of the first device is qualified to receive the removed attribute from the second device.

8. The device of claim 7, wherein the instructions are further configured to, when executed by the processor, cause the processor to annotate the removed attribute in accordance with the embedded synchronization marker.

9. The device of claim 8, wherein annotating the removed attribute comprises annotating the removed attribute with a playback timer in accordance with the synchronization marker.

10. The device of 8, wherein the instructions are further configured to, when executed by the processor, cause the processor to store the annotated removed attribute in the second device.

11. The device of claim 7, wherein the attribute comprises at least one of subtitles, credits, audio content, video content, a picture frame, or a portion of a picture frame.

12. The device of claim 7, wherein the embedded synchronization marker is further configured to indicate to the first device where to add the removed attribute to the static content in order to form the hybrid video.

13. A non-transitory computer-readable medium storing instructions for encoding a video, the instructions configured to, when executed by a processor, cause the processor to:
remove an attribute from a video comprising the attribute and static content, the attribute and the static content each configured to be played by a first device;
replace the removed attribute with content to be played by the first device in place of the removed attribute; and
embed a synchronization marker in the video,
wherein the embedded synchronization marker is configured such that when the first device encounters the embedded synchronization marker, the first device sends to a second device a request for the removed attribute,
wherein the embedded synchronization marker is further configured to synchronize streaming of the removed attribute from the second device to the first device with playing of the static content by the first device, such that a hybrid video that includes both the removed attribute and the static content is formed, and
wherein the embedded synchronization marker is further configured such that when the first device encounters the embedded synchronization marker, the first device sends to the second device user information configured to indicate to the second device whether a user of the first device is qualified to receive the removed attribute from the second device.

14. The non-transitory computer-readable medium of claim 13, wherein the instructions are further configured to, when executed by the processor, cause the processor to annotate the removed attribute in accordance with the embedded synchronization marker.

15. The non-transitory computer-readable medium of claim 14, wherein annotating the removed attribute comprises annotating the removed attribute with a playback timer in accordance with the synchronization marker.

16. The non-transitory computer-readable medium of claim 14, wherein:
the instructions are further configured to, when executed by the processor, cause the processor to store the annotated removed attribute in the second device.

17. The non-transitory computer-readable medium of claim 13, wherein the attribute comprises at least one of subtitles, credits, audio content, video content, a picture frame, or a portion of a picture frame.

18. The non-transitory computer-readable medium of claim 13, wherein:
the embedded synchronization marker is further configured to indicate to the first device where to add the removed attribute to the static content in order to form the hybrid video.

* * * * *